United States Patent Office 2,841,579
Patented July 1, 1958

2,841,579

DEPOLYMERIZATION OF CELLULOSE IN ALKALINE MEDIUM

Jacques A. Villefroy and William R. Saxton, Hawkesbury, Ontario, Canada, assignors to Canadian International Paper Company, Montreal, Canada, a corporation of Quebec, Canada No Drawing. Application April 15, 1954
Serial No. 423,532

Claims priority, application Canada April 6, 1954

20 Claims. (Cl. 260—233)

This invention relates to new and useful improvements in the depolymerization of cellulose by oxidation in an alkaline medium and particularly seeks to provide a novel method for effecting such depolymerization by incorporating stabilized metal catalysts into the reacting mass.

Oxidative depolymerization of cellulose in alkaline medium constitutes one of the basic stages of the viscose process where it is customarily referred to as aging, maturing or ripening of alkali cellulose. The term "aging" hereinafter will be used to denote this action. Although improvements in the manner in which this depolymerization can be accomplished will naturally bring to the fore the advantages for the viscose industry, owing to the fact that it is one of the largest consumers of dissolving pulp, it is quite evident that their benefits will extend to other industries as well whenever the degree of polymerization of the cellulose, whether it originates from cotton or from wood, must be brought down to relatively low values by alkaline oxidation. As examples we may mention the reduction of viscosity in the pulp refining process or in those industries engaged in the preparation of cellulose derivatives, such as, for instance, carboxymethyl cellulose, hydroxyethyl cellulose, methylcelluose, etc.

An object of this invention is to provide a novel method of effecting accelerated aging of alkali cellulose by incorporating into it small amounts of a selected metal catalyst which has been so treated that its hydroxide will not precipitate when formed in an alkaline medium.

Another object of this invention is to provide a method of the character stated in which the metal catalyst has been treated with a complexing, sequestering or chelating agent before being brought into contact with the cellulose.

Another object of this invention is to provide a method of the character stated in which the stabilized metal catalyst may be added to the cellulose before the cellulose is suspended in an alkaline medium, may be added to the alkaline medium, or may be added to the alkali cellulose formed as the result of suspending cellulose in an alkaline medium.

A further object of this invention is to provide a method of the character stated in which a metal such as iron, manganese or cobalt is used as a catalyst to accelerate the aging of the alkali cellulose and in which the metal catalyst has been treated by a hydroxy acid such as lactic or tartaric acid, or by a polyhydroxy alcohol such as glycerol, sorbitol or mannitol, or by a polyamino acid such as Versene T in order that the hydroxide of the catalyst will form as a stable solution in caustic soda.

It has long been known that some metals, particularly iron, manganese and cobalt, when present in even very small amounts, accelerate the aging of alkali cellulose. Although a more rapid aging of alkali cellulose is in itself a very desirable feature, these metals have for a long time been considered as harmful impurities which ought to be completely removed or at least kept as low as possible in the raw materials from which the alkali cellulose is made, i. e., caustic soda, water, and cellulose, since their variable concentration and condition caused corresponding variations in the aging process. It is one of the principal reasons why a commercial grade caustic soda, especially low in metallic contamination, is offered to the trade under the name of Rayon Grade caustic. It explains also why pulp manufacturers must effectively control the mineral impurity content of the cellulose.

The objective of aging alkali cellulose is to depolymerize cellulose and to do this in a precise and reproducible manner in order to reach a predetermined degree of polymerization. One of the principal objections against the use of metal catalysts is that up to now there have been too many uncertainties as to how these two requirements could be met in large scale operations.

We have discovered that many of the difficulties hitherto encountered arise from the fact that most soluble salts of the polyvalent metals suitable for use as catalysts when brought in contact with caustic soda form hydroxides whose solubilities vary considerably according to the conditions under which the reaction takes place. Under ordinary experimental conditions when relatively large amounts of metal salts are involved the hydroxide can be considered insoluble although this is only a first approximation. When, on the contrary, minute amounts or even traces are involved, as is normally the case in the practical application with which we are concerned, the solubility of the hydroxides is no longer negligible. A second factor of importance is the physical form of the precipitated hydroxide: it may vary considerably depending upon the conditions at the time of precipitation and range from very fine, easily suspended particles to coarse, rapidly settling aggregates.

These two factors play a vital role because they regulate the amount of catalyst which can be fixed on the cellulose with a certain method of addition as well as its degree of dispersion within the mass; the latter in turn determines the actual contact area between cellulose and catalyst and consequently the effectiveness of the catalyst.

Bearing these points in mind, it is easy to understand the nature of the difficulties which can be encountered when attempting to use a metal catalyst in an oxidative degradation in alkaline medium. Let us consider for instance the case of alkali cellulose.

Alkali cellulose is generally prepared by soaking a weighed amount of cotton linters or wood pulp, usually in sheet form, in an excess of caustic soda solution and, after a certain soaking time, pressing out the liquor to a definite weight. In one process, "books" of pulp sheets are steeped in the caustic liquor and the swollen books are pressed later between metal plates, the resulting alkali cellulose being shredded and then aged. This has been until recently the conventional process used in the viscose industry. A second method which is now gaining in importance is the slurry process which consists of breaking up the pulp sheets in the caustic solution to form a slurry from which the excess liquor is afterwards eliminated by a combination of draining and pressing operation. The resulting alkali cellulose is shredded and then aged. An aging catalyst can obviously be introduced in any one of three ways: to the caustic solution, to the alkali cellulose, or to the pulp.

If the catalyst is added to the caustic solution it is very desirable to avoid the formation of any precipitate in order to prevent losses through settling as well as to insure a thorough penetration into the cellulose during steeping. Even if it is possible to prevent settling of the precipitate, by agitation for instance, the particles of precipitate will not give as large a contact area between cellulose and catalyst as a true solution, for a given weight of catalyst. Furthermore, in the case of conventional steeping the penetration of the catalyst will be limited to the surface of the pulp sheet or at most a very thin superficial layer.

Addition of the catalyst to the alkali cellulose, for instance, during the shredding which precedes aging, would seem to be the most satisfactory procedure as it offers positive means for controlling the quantity of catalyst added and eliminates all difficulties arising from contamination of the caustic system. We have, however, found that even with this procedure, it is possible to obtain large variations in the apparent activity of the catalyst depending on the manner in which the addition is made. Rapid addition of a (relatively) concentrated metal salt solution in a coarse spray will produce less effect than slow addition (fine spray) of a dilute solution, indicating the necessity of having the catalyst in a finely dispersed state. There is, however, a limit to the dilution which can be tolerated as it is undesirable to add much water to the alkali cellulose.

The difficulties encountered when adding metal catalysts to the caustic soda or to the alkali cellulose no longer exists if the metals are added either in the form of a water solution which does not precipitate on coming into contact with strong caustic soda or in the form of a stable solution in strong sodium hydroxide. This can be achieved by incorporating into the metal salt solutions organic chemicals generally referred to as complexing, sequestering or chelating agents which have the property of locking the polyvalent metals in a complex structure. Much to our surprise we have found that, by a proper choice of complexing agent, the metals may be sequestered and precipitation of their hydroxides prevented without reducing their ability to hasten the oxidative depolymerization of cellulose. We have even found that some of these compounds increase the apparent activity of the catalyst, all other conditions of application remaining the same, since they minimize the causes for losses and diminished efficiency due to improper dispersion which have just been mentioned above. This discovery contradicts, in some ways, what could be anticipated from analogy with other fields of application where complexing compounds are used to prevent metals from reacting in an ordinary manner or as is often said to inactivate them. So often is this the case that it has been suggested to add complexing agents of the class of polyamino acids to ordinary grades of caustic soda to bring them to the rayon grade class; one of the objects of this addition was to prevent alteration of the viscosity of the viscose by the relatively large amounts of metallic impurities, particularly iron, contained in the ordinary grade. We have on the contrary found, as will be demonstrated later, that these compounds help metallic impurities to stay in solution and allow them to exert their catalytic effect with full efficiency when the caustic soda solution is incorporated into cellulose as in alkali cellulose manufacture.

The beneficial effect of these stabilizers is also found when the catalyst is added to the cellulose before the caustic treatment. The precipitation of large aggregates of metal hydroxide is prevented and uniform distribution throughout the alkali cellulose is effected. These benefits are especially apparent when relatively large amounts of catalyst have to be used and are most highly appreciated in the slurry process due to the continuous nature of this operation. The maximum benefit will, of course, become apparent as equilibrium in catalyst content becomes established between pulp and caustic.

The increased solubility of the metal catalyst in caustic alkali obtained by use of a complexing agent is illustrated by the following example:

Two samples of Novocell pulp containing 50 p. p. m. manganese with and without 2,000 p. p. m. sodium tartrate were slurried with 18% caustic soda containing 1% hemicellulose. The caustic drained off from each slurry was used to prepare a second slurry and the process was repeated for still a third slurry. Samples of each slurry were analyzed for manganese, with the following results:

|  | Manganese Concentration in Caustic Soda | |
|---|---|---|
|  | Novocell, 50 p. p. m. Manganese | Novocell, 50 p. p. m. Manganese, 2,000 p. p. m. Sodium Tartrate |
| 1st slurry | 2.16 | 2.76 |
| 2nd slurry | 3.79 | 4.80 |
| 3rd slurry | 6.60 | 7.76 |

While it is not our intention to give a complete list of the substances capable of forming stable solutions of metal hydroxides in caustic soda we may mention that compounds of the following classes have been found to have this useful property:

Hydroxy acids, for instance, lactic, tartaric and gluconic acids;
Polyamino acids;
Polyhydroxy alcohols, for instance, glycerol, sorbitol and mannitol.

The hemicellulose present in commercial grades of cellulose has also this property to a certain degree and this is probably the reason why the solubility of the hydroxides of such metals as iron, manganese and cobalt in caustic soda appears to be greater than could be expected, when they are formed in the presence of pulp, as is the case in the preparation of alkali cellulose.

It is unfortunately impossible to obtain a simple measurement of this property as the behaviour of each complexing compound varies not only with the metal considered but also the concentration of the metal salt and caustic soda solution and the manner in which they are mixed; furthermore, the stability of the solutions which can be prepared is not necessarily permanent and may vary from a few minutes to almost unlimited time depending upon the factors just mentioned. For these reasons, it is necessary to study each complexing compound under conditions approximating as closely as possible those under which it is intended to be used.

The data presented here show the results of tests made to find out the suitable conditions for preparing solutions of cobalt, manganese, or iron hydroxide in 18% caustic soda stable for at least 24 hours using either tartaric or gluconic acid as a complexing or stabilizing material; the differences between the two stabilizers and the three metals for this particular set of conditions are well illustrated by the following table:

| Metal | Ratio Stabilizer to Metal Ion | |
|---|---|---|
|  | Gluconic Acid | Tartaric Acid |
| Cobalt | 2 | 2–3.2 |
| Manganese | 8–13 | 20–80 |
| Iron | 2–4 | 14–16 |

Water solutions of salts of these three metals with sufficient stabilizer to prevent precipitation when brought into contact with 18% sodium hydroxide were prepared and tested for their ability to catalyze the depolymerization of cellulose. The desired amount of catalyst was either added to the caustic soda used for preparing the alkali cellulose or sprayed onto the freshly made alkali cellulose at the start of the shredding operation. The extent of the depolymerization after aging the alkali cellulose for known periods of time at a well-controlled temperature was determined by reacting the alkali cellulose with carbon disulphide and dissolving the cellulose xanthate in dilute caustic soda to form a solution containing 7% cellulose, 6% total alkalinity, and 2.7% total sulphur, and measuring the viscosity of the viscose solution thus obtained. The viscosity was measured as the time in seconds necessary for a 1/8" stainless steel ball to fall 15 cm. through a column of viscose in a 14 cm. diameter tube at 20° C.

These tests showed that although gluconic acid is one of the most interesting compounds from the point of view of stabilizing power it cannot be used for speeding up the aging of alkali cellulose because it inhibits the effect of the catalysts. Mucic acid was found to act similarly and it seems probable that all aldonic and saccharic acids must be excluded from use with aging accelerators. Tartaric acid was on the contrary found eminently suitable from both the point of view of stabilizing power and efficiency of the catalysts. Citric acid was found to act similarly. Versene T, a polyamino acid, was found useful for iron and cobalt but not for manganese; sorbitol for manganese and cobalt but poor for iron; lactic acid worked well with cobalt but not with manganese or iron.

The usefulness of our invention becomes still more evident when considering the following examples which illustrate the manner in which it can be carried out.

Example I

Novocell wood pulp in 800 gram batches was steeped in 11 litres of 216.5 g./l. caustic soda to which known quantities of catalysts had been added with and without stabilizer. The alkali cellulose after pressing and shredding under standard conditions was aged for 48 hours at 19° C., converted into cellulose xanthate and viscose and the viscosity of the solution measured as described above.

The lower viscosities obtained with use of catalysts in the presence of stabilizers indicate the increase in activity effected by the latter.

Example II

Same conditions as above except that the catalyst was added to the freshly made alkali cellulose at the beginning of shredding in the form of a stabilized solution in caustic soda. The method of addition and the viscosity of the viscose obtained after aging the alkali cellulose for 48 hours at 19° are shown in the table below. The experimental batches were compared to batches prepared either without any addition of catalyst or from pulp in which equivalent amounts of catalyst had been thoroughly and uniformly dispersed throughout the fiber by addition as a dilute salt solution. The latter have been found to give a measure of the maximum efficiency of the catalyst.

| Experiment No. | Amount of Catalyst added to Alkali Cellulose | Viscosity (aging 48 hrs. at 19°), sec. | Details of Treatment |
|---|---|---|---|
| 8 | 10 p. p. m. Mn added in stabilized caustic solution to shredder. | 38.6 | 8.25 ml. of 4.00 g./l. MnSO$_4$.4H$_2$O in 10 ml. H$_2$O plus 0.5 g. tartaric acid; 3.3 g. NaOH then added. |
| 9 | 10 p. p. m. Mn added in water solution to shredder. | 53.6 | As 8, but no tartaric acid or caustic soda. |
| 10 | 10 p. p. m. Mn soaked in pulp. | 35.4 | 9.00 ml. of 4.00 g./l. MnSO$_4$.4H$_2$O in 9.00 ml. H$_2$O soaked into 825 g. pulp, air dried before steeping. |
| 11 | 12 p. p. m. Mn added in stabilized caustic solution to shredder. | 32.6 | 10.8 ml. 4.0 g./l. MnSO$_4$.4H$_2$O plus 0.5 g. tartaric acid in 16 ml. H$_2$O plus .5 g. tartaric acid then 3.5 g. NaOH added. |
| 12 | 12 p. p. m. Mn added as water solution to shredder. | 56.9 | As 11, but no tartaric acid or caustic soda. |
| 13 | 12 p. p. m. Mn soaked in pulp. | 29.2 | 10.8 ml. 4.00 g./l. MnSO$_4$.4H$_2$O in 900 ml. water added to 825 g. of pulp, air dried before steeping. |
| 14 | No catalyst | 86.5 | 825 g. of pulp wetted with 900 ml. of distilled water and air dried before steeping. |

We claim:

1. The method of treating cellulose which comprises aging alkali cellulose in the presence of a metallic oxidation catalyst selected from the group consisting of cobalt, manganese and iron and an agent selected from the group consisting of tartaric and citric acids and their salts, said agent being effective to prevent precipitation of said catalyst without inhibiting its catalytic activity.

2. The method of claim 1 in which the amount of catalyst is from 0.1 to 200 p. p. m., based on pulp.

3. The method of claim 1 in which the amount of precipitation-preventing agent is from 2 to 100 times the weight of the catalyst.

4. The method of claim 1 in which the amount of catalyst is from 0.1 to 200 p. p. m., based on pulp, and in which the amount of precipitation-preventing agent is from 2 to 100 times the weight of the catalyst.

5. In the treatment of cellulose with an aqueous solution of alkali, the step of adding to the reaction mixture

| Experiment No. | Amount of Catalyst in Steeping Caustic | Viscosity (aging 48 hrs. at 19°), sec. | Details of Treatment |
|---|---|---|---|
| 1 | 0.2 p. p. m. Cobalt stabilized | 16.5 | 0.264 ml. of 40 g./l. CoCl$_2$.6H$_2$O plus .5 g. tartaric acid. |
| 2 | 0.2 p. p. m. Cobalt not stabilized. | 27.6 | As 1, but no tartaric acid. |
| 3 | 4.0 p. p. m. Manganese stabilized. | 21.2 | 5.28 ml. of 40 g./l. MnSO$_4$.4H$_2$O plus 2 g. tartaric acid. |
| 4 | 4.0 p. p. m. Manganese not stabilized. | 36.2 | As 3, no tartaric acid. |
| 5 | 40 p. p. m. Iron stabilized | 23.6 | 22 ml. of Fe (NH$_4$)$_2$(SO$_4$)$_2$ 125 g./l. plus 8 g. tartaric acid. |
| 6 | 40 p. p. m. Iron stabilized | 24.3 | Same as 5, but 8 g. of a polyamino acid (Versene T) in place of tartaric acid. |
| 7 | 40 p. p. m. Iron not stabilized. | 31.6 | As above, no tartaric acid. |
| 8 | No catalyst | 85.0 | No addition. | a metallic oxidation catalyst selected from the group consisting of cobalt, manganese and iron and an agent selected from the group consisting of tartaric and citric acids and their salts, said agent being effective to prevent precipitation of catalyst without inhibiting its catalytic activity.

6. The method of claim 5 in which the amount of catalyst is from 0.1 to 200 p. p. m., based on pulp.

7. The method of claim 5 in which the amount of precipitation-preventing agent is from 2 to 100 times the weight of the catalyst.

8. The method of claim 5 in which the amount of catalyst is from 0.1 to 200 p. p. m., based on pulp, and in which the amount of precipitation-preventing agent is from 2 to 100 times the weight of the catalyst.

9. In the treatment of cellulose with an aqueous solution of alkali, the step of adding to the alkali a metallic oxidation catalyst selected from the group consisting of cobalt, manganese and iron and an agent selected from the group consisting of tartaric and citric acids and their salts, said agent being effective to prevent precipitation of catalyst without inhibiting its catalytic activity.

10. The method of claim 9 in which the amount of catalyst is from 0.1 to 200 p. p. m., based on pulp.

11. The method of claim 9 in which the amount of psecipitation-preventing agent is from 2 to 100 times the weight of the catalyst.

12. The method of claim 9 in which the amount of catalyst is from 0.1 to 200 p. p. m., based on pulp, and in which the amount of precipitation-preventing agent is from 2 to 100 times the weight of the catalyst.

13. In the treatment of cellulose with an aqueous solution of alkali, the step of adding to the cellulose a metallic oxidation catalyst selected from the group consisting of cobalt, manganese and iron and an agent selected from the group consisting of tartaric and citric acids and their salts, said agent being effective to prevent precipitation of catalyst without inhibiting its catalytic activity.

14. The method of claim 13 in which the amount of catalyst is from 0.1 to 200 p. p. m., based on pulp.

15. The method of claim 13 in which the amount of precipitation-preventing agent is from 2 to 100 times the weight of the catalyst.

16. The method of claim 13 in which the amount of catalyst is from 0.1 to 200 p. p. m., based on pulp, and in which the amount of precipitation-preventing agent is from 2 to 100 times the weight of the catalyst.

17. In the treatment of cellulose with an aqueous solution of alkali, the step of adding to the alkali-cellulose a metallic oxidation catalyst selected from the group consisting of cobalt, manganese and iron and an agent selected from the group consisting of tartaric and citric acids and their salts, said agent being effective to prevent precipitation of catalyst without inhibiting its catalytic activity.

18. The method of claim 17 in which the amount of catalyst is from 0.1 to 200 p. p. m., based on pulp.

19. The method of claim 17 in which the amount of precipitation-preventing agent is from 2 to 100 times the weight of the catalyst.

20. The method of claim 17 in which the amount of catalyst is from 0.1 to 200 p. p. m., based on pulp, and in which the amount of precipitation-preventing agent is from 2 to 100 times the weight of the catalyst.

References Cited in the file of this patent

UNITED STATES PATENTS

| | | |
|---|---|---|
| 1,955,239 | Kampf et al. | Apr. 17, 1934 |
| 2,542,285 | Mitchell | Feb. 20, 1951 |
| 2,542,492 | Entwistle et al. | Feb. 20, 1951 |
| 2,663,704 | Yehling | Dec. 22, 1953 |
| 2,682,536 | Mitchell | June 29, 1954 |

OTHER REFERENCES

The Modern Chelating Agent-Versene-Bersworth Chem. Co. Technical Bulletin No. 1, 1949, page 23.

The Versenes-Bersworth Chem. Co. Technical Bulletin No. 2, 1952, pages 10 and 21.